United States Patent [19]

Grandclement

[11] 4,175,590
[45] Nov. 27, 1979

[54] ELECTRIC VALVES

[75] Inventor: Gerard Grandclement, Cap d'Ail, France

[73] Assignee: International Cold Forging Corporation, Monaco

[21] Appl. No.: 816,335

[22] Filed: Jul. 18, 1977

[30] Foreign Application Priority Data

Jul. 20, 1976 [MC] Monaco .................................... 1206

[51] Int. Cl.² ........................ F16K 27/10; F16K 31/40
[52] U.S. Cl. .................................. 137/883; 92/98 R; 251/366; 251/30
[58] Field of Search ..................... 251/366, 367, 38, 30; 92/98; 285/286; 156/73.1; 137/883

[56] References Cited

U.S. PATENT DOCUMENTS

| | | | |
|---|---|---|---|
| 935,566 | 9/1909 | Twiford | 137/883 |
| 1,099,713 | 6/1914 | Morris | 137/883 |
| 3,459,221 | 8/1969 | Axelrod | 137/883 |
| 3,480,040 | 11/1969 | Erickson | 137/883 |
| 3,562,078 | 2/1971 | Zumstein | 156/73.5 X |
| 3,593,956 | 7/1971 | McCarty, Jr. | 251/45 X |
| 3,643,694 | 2/1972 | Duke et al. | 137/883 |
| 3,844,531 | 10/1974 | Grengs | 251/366 X |
| 3,917,218 | 11/1975 | Marocco | 251/38 X |
| 3,980,273 | 9/1976 | Turner et al. | 251/366 |

*Primary Examiner*—Arnold Rosenthal
*Attorney, Agent, or Firm*—Frishauf, Holtz, Goodman & Woodward

[57] ABSTRACT

In an assembly of two component members intended to be made fast with one another with fusion bonding into one single pair, of two pairs of zones of thermo-bondable plastics material pertaining one pair to each of said two component members, the component members are of such form that, when said zones are merged into coincident portions, a closed vacant space adjacent to the coincident portions is delimited between the component members.

The component members may be the body and cap of an electric valve employed in domestic equipment such as washing machines.

11 Claims, 11 Drawing Figures

ELECTRIC VALVES

The present invention relates to electric valves for distributing water or other fluids and particularly valves having an assembly of two component members fastened together by fusion bonding between two pairs of zones of thermo-bondable plastics material, one pair provided on each of said two component members.

In such electric valves the internal components, for example the elastic membrane, the magnetic core and the like, are generally enclosed between component members of moulded plastics material one of which is the valve body and the other a cap which contains the magnetic core and which compresses the elastic membrane against the body to produce a tight seal between the two component members.

The cap, or caps in the case of multi-way valves, must be very securely fixed to resist the pressure of the fluid which exists permanently within the valve. For example, the water pressure in mains for drinking water may reach 10 bars, which in a valve of 30 mm diameter results in a permanent wrenching force of some 70 kg.

Normally, the cap is secured by screws which are inserted into the valve body to lock the cap against the body and compress the elastic membrane. The number of screws on the periphery of the valve must be large and the rigidity, that is to say the thickness of the valve body and of the caps must be consistent in order to ensure a sufficiently tight fit over the entire periphery. This must also continue for the entire life of the valve, in spite of the loss of mechanical characteristics of the plastics materials generally employed.

In spite of a large number of screws and a considerable thickness of the component members it frequently occurs after a certain time in use that the electric valves begin to leak which leads to considerable flooding when such valves are employed, for example, in washing machines.

In order to obviate this disadvantage, the electric valve according to the invention, which is of the piloted type, comprises a body of plastics material, preferably of thermoplastic, thermo-bondable material, in which is mounted an elastic membrane comprising an insert provided with central pilot hole putting the control space enclosed between the membrane and the cap, into communication with the valve. This valve further comprises a cap made of the same material as the body and in which are placed a magnetic core and its elastic gasket intended to close the pilot hole of the insert, and a compression spring urging the core in the direction opposite to an electromagnet placed around the cap. The value of the invention is mainly characterised in that the cap has an axis of revolution and comprises on its periphery at least two circular steps, superimposed and of different diameters, coming face-to-face with steps of the body having the same axis of revolution, so that the two steps of the cap each have a part which comes together or coincides with the steps of the body in order to produce a double bond by ultrasonic means or by rotation over the entire periphery of the component members, the forms of the two component members being such that on the one hand the cap is guided diametrically into the body before the bonding is initiated, and that on the other hand gaps of volumes greater than the coincident volumes of the two component members are provided to accommodate the bonding excesses or burrs.

In this way the cap or caps are affixed to the valve body by a double bond. Since they are bonded the component members may be of less bulk. As a further precaution, a double bond is effected over the entire periphery. Furthermore, the membrane is no longer required to provide the water-tight seal, since this is obtained by the double bonding whilst taking certain precautions as detailed hereinafter. Generally, the body and the cap are of poly (phenylene oxide) or of polyamide (polyamide 66) possibly filled with glass fibres.

Since screws, and the operations these involve, are no longer necessary, there is a marked reduction in the cost of manufacture and also in the dimensions of the product so that the possibilities of application are increased.

According to the invention two component members are fastened together into a unitary assembly fusion bonding at two pairs of zones of thermo-bondable plastics material, one pair being provided on each of said two component members, and the form of the component members is such that, when said zones are merged into coincident portions, a closed vacant space adjacent to the coincident portions is delimited between the component members.

By "coincidence" is meant that there should be imagined two original zones being brought together to form one single zone which does not occupy any more volume than one of the original zones. In reality, the excess material is accommodated in the closed vacant space provided precisely for this purpose and which therefore has a volume at least equal to that of the coincident parts.

When this volume is greater than the limit just given, assembly of two component members of thermo-bondable plastics material bonding together along two bonding zones of each of the component members, the assembly is characterised by a closed vacant space adjacent to the bonding zones.

The two component members preferably have a common axis of revolution and are intended to be fixed together by bringing one towards the other along said axis, the two elements being in contact with one another along guide walls which are parallel to said direction.

The invention will be more readily understood from a description of various embodiments which are offered merely as examples of a non-limitative character and are illustrated in the accompanying drawings, in which.

Figure 1:
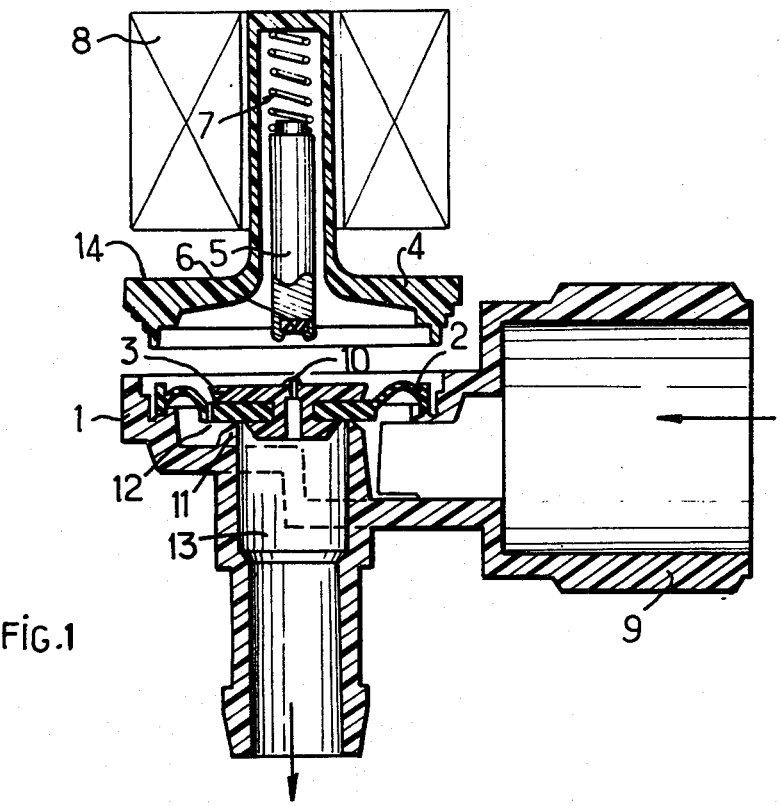
FIG. 1 is a sectional view of an electric valve with one outlet, before welding (fusion bonding)

Referring now to the drawings, FIG. 1 is a cross-section of a simple, one-way valve with piloted aperture, the valve being here shown before the fusion of the cap to the body.

The body 1 of the valve, which is of plastics material, preferably thermoplastic material, has one face serving as seat for the rubber membrane 2 and its insert 3 of a plastics material which is impervious to the fluid passing through the valve. The insert 3 is essentially integral with the membrane 2.

The cap 4 carries the magnetic core 5 with rubber sealing joints 6 and also the compression spring 7. The electromagnetic coil 8 is not shown in detail in the figure but is simply indicated symbolically. The manner of working is known of this type of electric valve which is normally closed when no current passes to the coil 8. When the magnetic core 5 and its sealing gasket 6, under pressure of the spring 7, close the centre hole 10 in the insert 3, the pressure of the mains to which the electric valve is linked by the inlet connection 9 is exerted through the control aperture 12 of the membrane into the closed control chamber, which is limited by the membrane 2 and cap 4, thus pressing the membrane 2 firmly against the seat 11 of the valve body 1. If current is passed to the coil 8, the magnetic core 5 is raised to meet and compress the spring 7, thus disengaging the seal 6 of the hole 10 in the insert 3. The pressure in the control chamber limited by the membrane 2 and cap 4 falls, since the hole 10 communicates between the control chamber and the outlet connection 13, so that the membrane rises upwards disengaging from the seat 11 and allowing the fluid to flow towards the valve outlet 13.

According to the invention the cap 4 is secured to the valve body 1 by the bonding of these two pieces at the peripheral zone of the cap 4 which has a vertical axis of revolution, whilst the part of the body 1 situated opposite this zone also has a vertical axis of revolution.

The bonding is preferably ultrasonic, that is to say ultrasonic vibrations are applied to the upper plane surface 14 of the cap before positioning the electromagnet 8, the valve body resting upon a rigid base (not illustrated). The shocks imparted to the contacting parts of the two pieces 1 and 4 produce a very rapid local heating which causes the pieces to fuse and to bond together in the zone of contact by reason of the pressure exerted on the cap 4. The bond may also be effected by rapid rotation of the two pieces relative to each other, whereby the friction also produces local heating and the parts are fused together.

Figure 2:
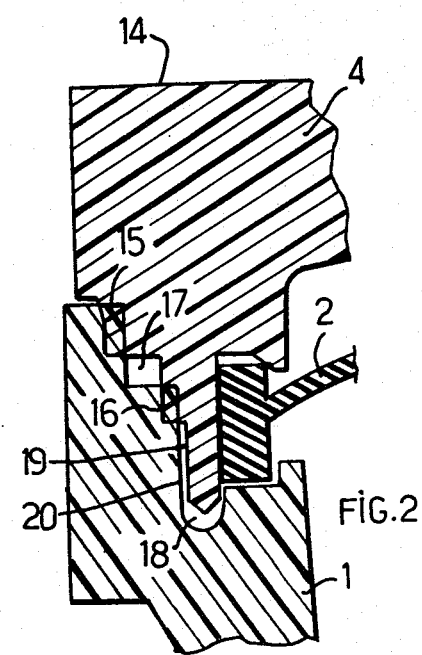
FIG. 2 is an enlargement of a detail of the welded parts.

In order to ensure that the bond is secure, a second bonding is effected, as will be seen in FIG. 2 which is an enlargement of part of the device of FIG. 1 around a bonded part of the two pieces after the bonding, there being provided on each side of the bonds vacant spaces in which the burrs from the bonds can be accommodated. In this connection, the burr from one bond should not be allowed to infiltrate into the other bond since this in the long term might endanger the tightness of the seal. It is also necessary for the excess material to find a space to receive it in order to avoid restricting the descent of the cap in relation to the body during bonding. The cap 4 comprises two cylindrical ring portions 15 and 16 which are common (coincident) with portions of the body 1 in the position assumed after bonding. It is these two common portions which fuse on the two respective pieces during the ultrasonic treatment which produces the double bond in the form of two complete fused ring portions each joining the two pieces. The excess material is equivalent to the surface of the cross-sectional areas of the common fused rings 15 and 16 that constitute bonding zones and infiltrates from both sides of the bonding zones. For this reason vacant spaces 17 and 18 are provided which have volumes greater than those of the fused portions 15 and 16 so that they can accommodate the entire excess material.

Figure 9:
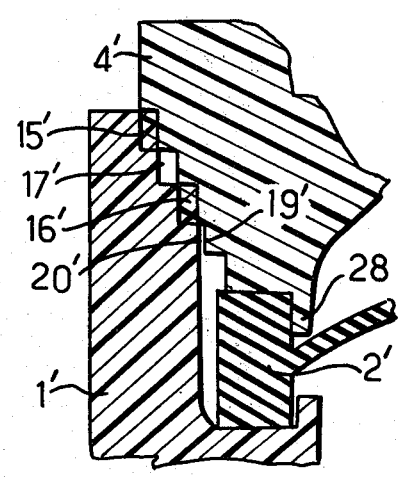
FIG. 9 is a part-view in section of an electric valve.
Figure 11:
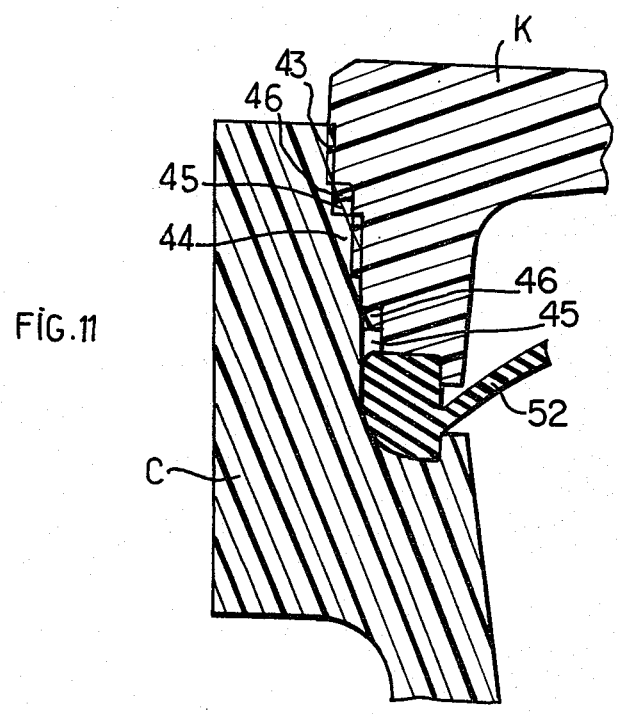

In FIGS. 2 and 9, the excess material squeezed out of the bonding zones is not shown, but FIG. 11 shows the presence of the squeezed material.

When the cap is lowered towards the body for the bonding, axial guidance is provided by the cylindrical parts 19 and 20 of these two pieces, the cap fitting into the valve body before the bonding begins.

Also shown in FIG. 2 is the peripheral part of the membrane 2, the diameter and the height of which are determined by formations within the cap and valve body.

FIG. 9 shows a modified form of that shown in FIG. 2 which may be employed in order to render such valves more compact. Here, the membrane 2' is no longer maintained in the cap by its outer portion but rather by the interior face of its thickened peripheral portion which is lightly tensioned against a projection or circular rib 28 on the cap 4 whereby the membrane is fitted onto the cap 4 before this latter is positioned in the body for the bonding.

Figure 3:
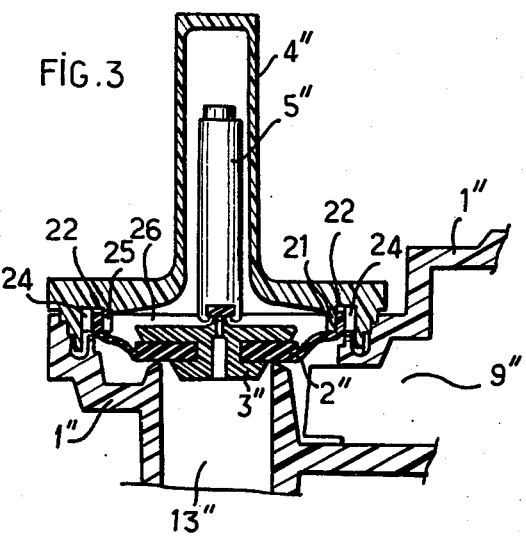
FIG. 3 is a sectional view of part of a simple valve, showing one embodiment.
Figure 4:
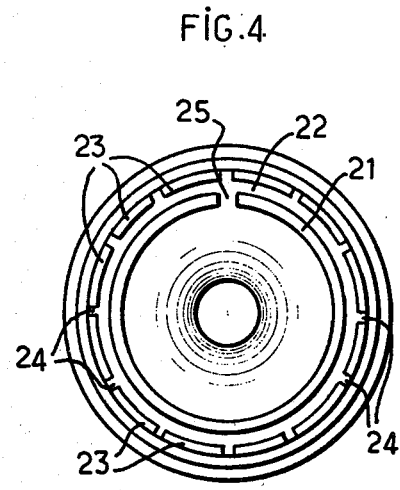
FIG. 4 is a view from beneath of the valve cap shown in FIG. 3.
Figure 5:
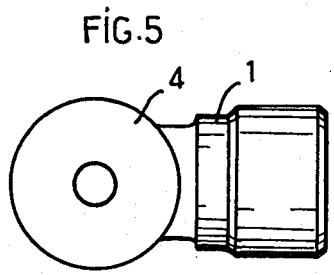
FIGS. 5 to 8 illustrate other embodiments.
Figure 6:
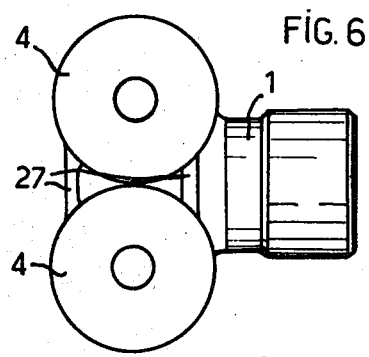
Figure 7:
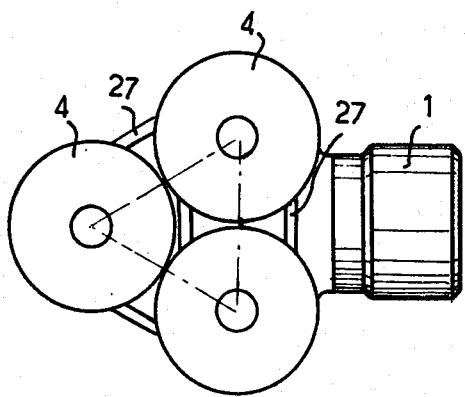
Figure 8:
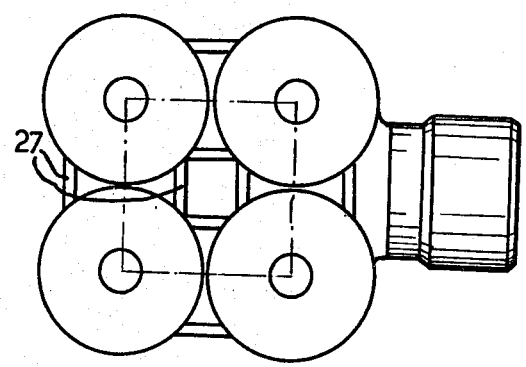

The membrane however is not intended to act as a seal between the valve body 1 and the cap 4 as is the case in valves which are screwed together. The membrane may for example be secured to the cap as shown in FIG. 3. Here a modification is shown of the membrane which is rendered possible by the valve design utilising the already-described bond between the cap and the body. The membrane 2' in FIG. 3 no longer has the control aperture 12 shown in FIG. 1, this being replaced by a system of slots in the cap, as will be seen in FIG. 4 which is a view of the cap from beneath.

Beginning with the greatest diameter, a system of ribs 23 is seen which define a plurality of slots 24, the purpose of which is to act as a filter preventing particles from entering the control chamber 26. A groove 22 is also provided which receives the peripheral rib of the membrane 2 and grips it tightly in position,. A part of the groove 22, appearing above the membrane rim in FIG 3, is not occupied by the membrane, so that it may receive and collect the fluid passing through the slots 24. There is also a circular rib 21 interrupted by a slot 25 which transmits the pressure of the fluid supply to the control chamber 26.

It is evident that the same result might be obtained by securing the membrane to the valve body and not to the cap, in which case the body then contains the relevant system of slots and ribs.

Modified forms are illustrated in FIGS. 5 to 8 which are views from above of the electric valves according to the invention, of simple one-way, two-way, three-way and four-way type before mounting of the electromagnets in the caps.

On the bodies of the valves, which are in one piece in each drawing, each way has an axis of revolution which coincides with that of the cap. Moreover, the caps of two or more ways in juxtaposition to each other may be linked together by ribs 27, for example, to form one single piece whereby assembly is facilitated. The distances between the axes of revolution of ways in juxtaposition are constant, the axes of the ways of a three-way valve lie on the apices of an equilateral triangle, and those of a four-way valve lie on the corners of a square.

Figure 10:
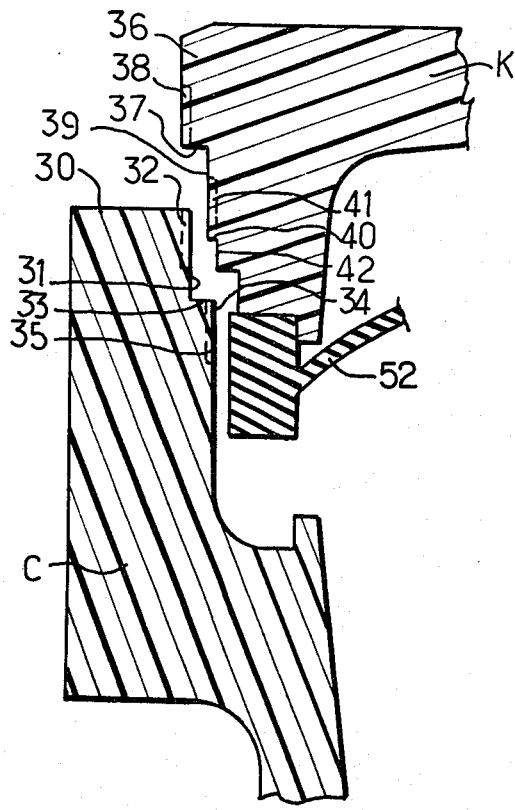
FIGS. 10 and 11 show parts which have been welded.

FIG. 10 is a view, partly in section of a valve body C and cap K, having a common axis of revolution XX' shown before being brought together for thermo-bonding.

The body C comprises an upper horizontal face 30 at right angles to a vertical face 31. The faces 30 and 31 form a first step. At the corner of this step a zone 32 is shown which is bounded within the step by lines of dashes. The face 31 is then followed by a horizontal face 33. This face 33 forms together with a subsequent vertical face 34, a second step, at the corner of which is shown a zone 35 bounded by a portion of the faces 33 and 34 and by lines of dashes extending into the step.

The cap K comprises a vertical face 36 which, together with a horizontal face 37 immediately adjacent thereto and on the same level as the bottom of face 36, a first step in which is shown a zone 38.

The first step is followed by a second step formed by faces 39 and 40 comprising a zone 41. The horizontal face 40 is then followed by a vertical face 42 which, on contacting the face 34, serves to guide the vertical displacement of the cap K into the body C.

As the cap K approaches the body C in a vertical downward direction, for the fixing operation, the zones 32 and 35 coincide respectively with the zones 38 and 41, forming fused portions 43 and 44 (FIG. 11). When these zones coincide, that is to say when one fused portion is assumed to occupy the same volume as a single one of these zones, a closed vacant space 45 is created which is adjacent to the parts 43, 44 between the cap K and the body C. Said spaces 45, whose volume is greater than the sum of half of zone 32 and half of zone 38, is intended to accommodate the excess fused bond material 46.

I claim:

1. An electric valve comprising a casing which has an inlet and an outlet connection, a seat for a membrane, a magnetically actuated valve shutter, a flexible, impervious membrane, clamped at its periphery, and an insert tightly held in the midportion of said membrane and having a hole therethrough, said membrane being in contact with said seat so as to define with the casing and the insert a control chamber which communicates with the outlet connection by said hole provided in said insert, which hole is normally closed by said valve shutter, said control member also communicating with the inlet connection by a restricted passage, and magnetic means for actuating said valve shutter so that it disengages from the hole, and further comprising the improvement which consists in that:

said casing is made of a first portion and a second portion both made of the same thermoplastic material, said first portion being shaped as a valve body and said second portion being shaped as a cap for said valve body shape and defining said control chamber with said membrane and said insert thereof and also supporting said valve shutter and said magnetic actuating means;

said control chamber, outlet connection, membrane, insert and actuator have an axis common to surface-of-revolution shaping of each of them;

said membrane has an annularly cylindrical peripheral rim having at least one cylindrical surface substantially coaxial with said axis and said rim is restrained in a radial direction by a cylindrical surface of one of said casing portions likewise coaxial with said axis; and said first and second portions respectively have opposite stepped portions where they meet which are formed by cylindrical riser surfaces coaxial with said axis offset radially by surfaces perpendicular to said axis, two opposed pairs of said step riser surfaces being overlapped and fused by ultrasonic thermomechanical bonding under axial forcing together of said portions by reason of the diameter of the external riser surface of the casing portion that fits inside the other casing portion at their joint being slightly greater than the internal diameter of the internal riser surface of said outer casing portion at the joint, said two pairs of fused step riser surfaces being separated by an intermediate pair of said step riser surfaces of said respective casing portions which are separated from each other by the width of a pair of said radially offsetting surfaces likewise separated from each other, so that an annular cavity is formed thereby which is at least partially filled with material squeezed out from at least one of the fused overlaps of said adjacent opposed pairs of riser surfaces of said respective casing portions, whereby axially and radially offset tandem sealed annular bonds are provided joining said first and second casing portions and seal said casing peripherally independently of the manner in which said membrane is held therein.

2. An electric valve as defined in claim 1 in which the cylindrical surfaces of the stepped portion of said first casing portion are internal surfaces facing towards said axis and the cylindrical surfaces of the stepped portion of said second casing portion are external surfaces facing away from said axis, so that said second casing portion, of cap shape, is fitted inside said first casing portion, of valve body shape, at their stepped joint providing said offset annular bonds.

3. An electric valve as defined in claim 1 in which said restricted passage is formed by a perforation (12) through said membrane located outwardly of said midportion of said membrane.

4. An electric valve as defined in claim 1 in which said cylindrical membrane rim surface by which said rim of membrane (2,52) is restrained is a radially outwards facing surface and faces a radially inwards facing cylindrical surface of said second casing portion (4,K) by which said membrane rim is restrained.

5. An electric valve as defined in claim 1 in which said cylindrical membrane rim surface by which rim of said membrane (2') is restrained is a radially inwards facing surface and faces a radially outwards facing cylindrical surface of said second casing portion (4') by which said membrane rim is restrained 6. An electric valve as defined in claim 1 in which said cylindrical rim of said membranne (2") fits in a groove (22) of one of said casing portions without extending into the full depth of said groove and said restricted passage is a gap (25) in the radially inner wall (21) of said groove, while the outer wall of said groove is provided by a plurality of shoulder segments (23) separated by filtering gaps (24) for admitting fluid from said inlet chamber (9") to said control chamber (26) by way of the portion of said groove (22) unoccupied by said membrane rim and through said restricted passage (25).

7. An electric valve as defined in claim 6 in which said groove (22) is provided in said second casing portion (4").

8. An electric valve as defined in claim 7 in which the cylindrical surfaces of the stepped portion of said first casing portion are internal surfaces facing towards said axis and the cylindrical surfaces of the stepped portion of said second casing portion are external surfaces facing away from said axis, so that said second casing portion, of cap shape, is fitted inside said first casing portion, of valve body shape, at their stepped joint providing said offset annular bonds.

9. An electric valve as defined in claim 8 in which said casing has two outlet connections, two said second casing portions of cap shape, and two membranes forming two said control chambers, as well as two said valve shutters, each said outlet connection having an axis of surfaces of revolution in common with one of said second casing portions, one of said membranes, one of said valve shutters and one of said control chambers, said axes of revolution being substantially parallel to each other, and each said second casing portions is joined to said first casing portion as set forth in claim 14 with respect to the axis of surfaces of revolution of the respective second casing portion to form a unitary casing, said second casing portions being also joined together independently of being each joined to said first casing portion.

10. An electric valve as defined in claim 1 in which said casing has three outlet connections, three said second casing portions of cap shape, and three membranes forming three said control chambers, as well as three said valve shutters, each said outlet connection having an axis of surfaces of revolution in common with one of said second casing portions, one of said membranes, one of said valve shutters and one of said control chambers, said axes of revolution being substantially parallel to each other and disposed so that they transverse planes substantially at the corners of an equilateral triangle, and each said second casing portions is joined to said first casing portion as set forth in claim 14 with respect to the axis of surfaces of revolution of the respective second casing portion to form a unitary casing, said second casing portions being also joined together independently of being each joined to said first casing portion.

11. An electric valve as defined in claim 1 in which said casing has four outlet connections, four said second casing portions of cap shape, and four membranes forming four said control chambers, as well as four said valve shutters, each said outlet connection having an axis of surfaces of revolution in common with one of said second casing portions, one of said membranes, one of said valve shutters and one of said control chambers, said axes of revolution being sub-tantially parallel to each other and disposed so that they tranverse planes substantially at the corners of a square, and each said second casing portions is joined to said first casing portion as set forth in claim 1, with respect to the axis of surfaces of revolution of the respective second casing portion, to form a unitary casing, said second casing portions being also joined together independently of being each joined to said first casing portion.

* * * * *